US012652675B2

(12) United States Patent
Kumagai et al.

(10) Patent No.: US 12,652,675 B2
(45) Date of Patent: Jun. 9, 2026

(54) SHARED SLOT FORMAT INDICATION FOR MULTIPLE COMPONENT CARRIERS

(71) Applicant: NTT DOCOMO, INC., Tokyo (JP)

(72) Inventors: Shinya Kumagai, Tokyo (JP); Hiroki Harada, Tokyo (JP); Shohei Yoshioka, Tokyo (JP); Yuki Takahashi, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 467 days.

(21) Appl. No.: 17/914,175

(22) PCT Filed: Mar. 24, 2020

(86) PCT No.: PCT/JP2020/013156
§ 371 (c)(1),
(2) Date: Jan. 31, 2023

(87) PCT Pub. No.: WO2021/192065
PCT Pub. Date: Sep. 30, 2021

(65) Prior Publication Data
US 2023/0247647 A1      Aug. 3, 2023

(51) Int. Cl.
*H04W 72/232*      (2023.01)
*H04L 5/00*      (2006.01)
*H04W 72/0446*      (2023.01)

(52) U.S. Cl.
CPC .......... *H04W 72/232* (2023.01); *H04L 5/001* (2013.01); *H04W 72/0446* (2013.01)

(58) Field of Classification Search
CPC ........... H04W 72/232; H04W 72/0446; H04W 72/23; H04L 5/001
See application file for complete search history.

(56) References Cited

U.S. PATENT DOCUMENTS

| | | | |
|---|---|---|---|
| 2018/0368114 A1 | 12/2018 | Chen et al. | |
| 2019/0124558 A1* | 4/2019 | Ang | H04L 5/001 |
| 2020/0128520 A1* | 4/2020 | Chen | H04W 72/21 |
| 2020/0275439 A1* | 8/2020 | Xue | H04L 1/0083 |
| 2020/0296576 A1* | 9/2020 | Ouchi | H04L 5/001 |
| 2020/0404628 A1* | 12/2020 | Jo | H04W 72/23 |
| 2021/0266139 A1 | 8/2021 | Takeda et al. | |
| 2021/0266828 A1* | 8/2021 | Hwang | H04W 72/23 |

(Continued)

FOREIGN PATENT DOCUMENTS

| | | | | |
|---|---|---|---|---|
| WO | 2018/231678 A1 | 12/2018 | | |
| WO | 2019/032821 A1 | 2/2019 | | |
| WO | WO-2019047553 A1 * | 3/2019 | | H04L 1/00 |

(Continued)

OTHER PUBLICATIONS

Carrier Aggregation Under Different Subframe Structures In New Radio, Qualcomm, Wanshi Chen, Jun. 16, 2017 (Year: 2017).*

(Continued)

*Primary Examiner* — Ian N Moore
*Assistant Examiner* — Latresa A McCallum
(74) *Attorney, Agent, or Firm* — Osha Bergman Watanabe & Burton LLP

(57) ABSTRACT

A terminal is disclosed including a receiver that receives downlink control information from a network; and a controller that applies a slot format indicated by the downlink control information to a plurality of component carriers.

4 Claims, 9 Drawing Sheets

(56)                    References Cited

U.S. PATENT DOCUMENTS

2021/0377943  A1 *  12/2021  Park ........................ H04L 5/001
2024/0163893  A1 *   5/2024  Chen ..................... H04W 24/08

FOREIGN PATENT DOCUMENTS

WO        2020/016938  A1     1/2020
WO        2020/016939  A1     1/2020

OTHER PUBLICATIONS

Extended European Search Report issued in counterpart European Patent Application No. 20927275.6, mailed on Nov. 9, 2023 (6 pages).
International Search Report issued in PCT/JP2020/013156 on Nov. 2, 2020 (2 pages).
Written Opinion of the International Searching Authority issued in PCT/JP2020/013156 on Nov. 2, 2020 (4 pages).
NTT Docomo, Inc.; "Remaining issues on group-common PDCCH"; 3GPP TSG RAN WG1 Meeting 90bis, R1-1718205; Prague, CZ; Oct. 9-13, 2017 (10 pages).
LG Electronics; "Discussion on the contents of group common Pdcch"; 3GPP TSG RAN WG1 Meeting #90, R1-1713171; Prague, Czech Republic; Aug. 21-25, 2017 (7 pages).
Qualcomm; "New WID on Extending current NR operation to 71 Ghz"; 3GPP TSG RAN Meeting #86, RP-193229; Sitges, Spain; Dec. 9-12, 2019 (5 pages).

* cited by examiner

Figure 4:
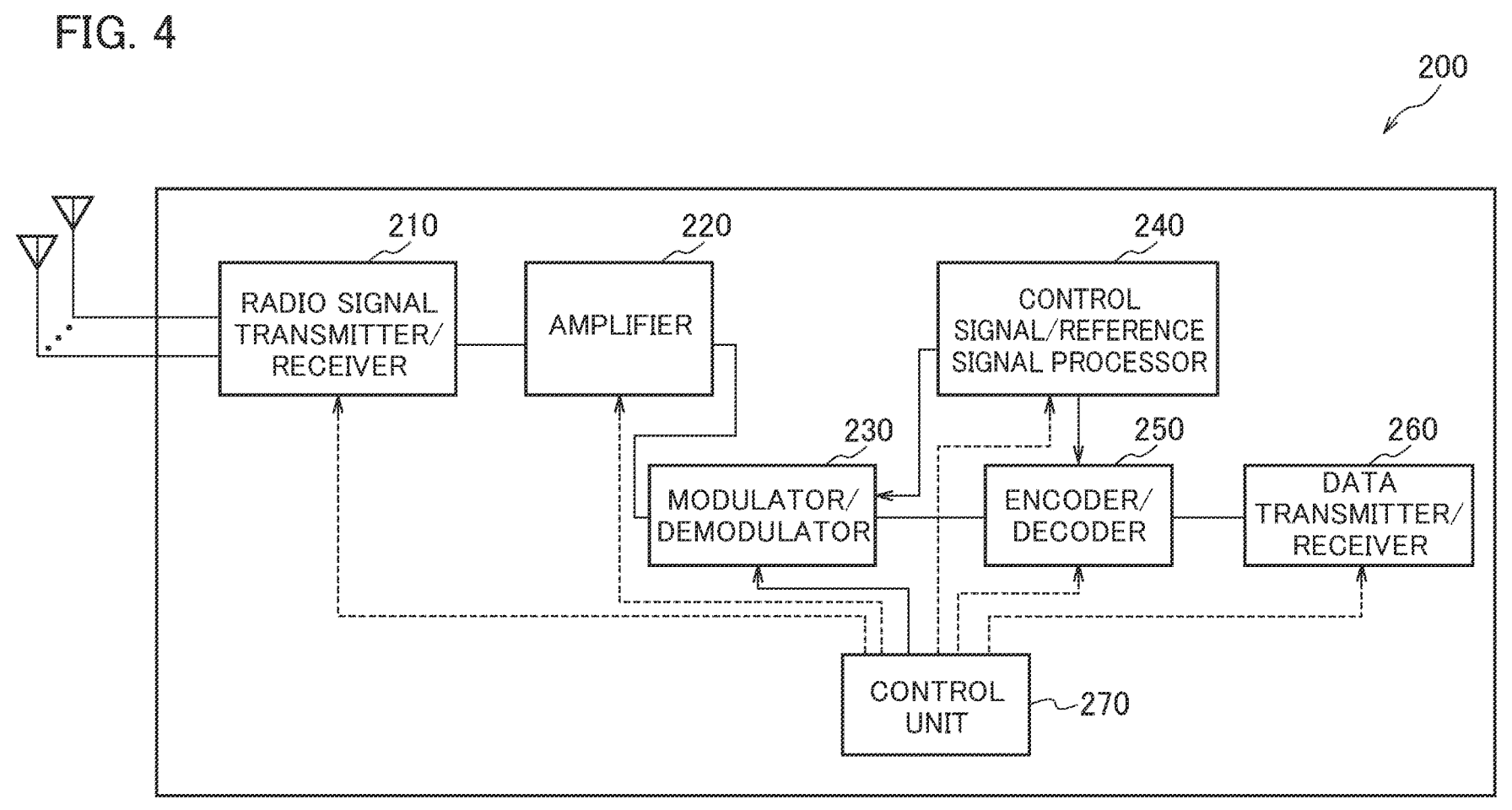

210 RADIO SIGNAL TRANSMITTER/ RECEIVER

220 AMPLIFIER

230 MODULATOR/ DEMODULATOR

240 CONTROL SIGNAL/REFERENCE SIGNAL PROCESSOR

250 ENCODER/ DECODER

260 DATA TRANSMITTER/ RECEIVER

270 CONTROL UNIT

FIG. 6

SlotFormatCombinationsPerCell information element

```
-- ASN1START
-- TAG-SLOTFORMATCOMBINATIONSPERCELL-START

SlotFormatCombinationsPerCell ::=    SEQUENCE {
    servingCellId              SEQUENCE (SIZE (1..maxNrofCellsPerGroup))OF ServCellIndex,
    subcarrierSpacing          SubcarrierSpacing,
    subcarrierSpacing2         SubcarrierSpacing                                             OPTIONAL, -- Need R
    slotFormatCombinations     SEQUENCE (SIZE (1..maxNrofSlotFormatCombinationsPerSet)) OF SlotFormatCombination
                                                                                            OPTIONAL, -- Need M
    positionInDCI              INTEGER(0..maxSFI-DCI-PayloadSize-1)                          OPTIONAL, -- Need M
    ...
}

SlotFormatCombination ::=       SEQUENCE {
    slotFormatCombinationId      SlotFormatCombinationId,
    slotFormats                  SEQUENCE (SIZE (1..maxNrofSlotFormatsPerCombination)) OF INTEGER (0..255)
}

SlotFormatCombinationId ::=      INTEGER (0..maxNrofSlotFormatCombinationsPerSet-1)

-- TAG-SLOTFORMATCOMBINATIONSPERCELL-STOP
-- ASN1STOP
```

FIG. 7

| Slot format indicator 1 | Slot format indicator 2 | ... | Slot format indicator N |

SHARED SLOT FORMAT INDICATION FOR MULTIPLE COMPONENT CARRIERS

TECHNICAL FIELD

The present disclosure relates to a terminal that performs radio communication, and particularly to a terminal that performs radio communication using a plurality of component carriers.

BACKGROUND ART

3rd Generation Partnership Project (3GPP) specifies 5th generation mobile communication system (5G, also called New Radio (NR) or Next Generation (NG)), while next-generation specifications called Beyond 5G, 5G Evolution, or 6G is also in progress.

Release 15 and Release 16 (NR) of 3GPP specify operations in a plurality of frequency ranges, specifically, a frequency band including FR1 (410 MHz to 7.125 GHz) and FR2 (24.25 GHz to 52.6 GHz).

In addition, NR that supports up to 71 GHz beyond 52.6 GHz is also under study (Non Patent Literature 1). Furthermore, Beyond 5G, 5G Evolution, or 6G (from Release 18 onward) is targeted to support frequencies above 71 GHz.

CITATION LIST

Patent Literature

Non Patent Literature

Non Patent Literature 1: "New WID on Extending current NR operation to 71 GHz", RP-193229, 3GPP TSG RAN Meeting #86, 3GPP, December 2019

SUMMARY OF INVENTION

As described above, it is assumed that the possibility of setting more component carriers (CC) increases if the usable frequency band is expanded.

Carrier aggregation (CA) defines the number of CCs that can be set. For example, in Release 15 and Release 16 of 3GPP, the maximum number of CCs that can be set for a terminal (User Equipment, UE) is 16 CCs in downlink (DL) and uplink (UL), respectively.

On the other hand, the physical layer and the medium access control layer (MAC) are set for each CC. For example, one downlink control information (Downlink Control Information: DCI) can schedule only one CC, and therefore a large number of DCIs are required to schedule a large number of CCs.

This may tighten the capacity of the Physical Downlink Control Channel (PDCCH) used to transmit the DCI.

Therefore, the following disclosure is made in view of such situation and aims to provide a terminal that can realize efficient control of CCs using downlink control information (DCI) even when a large number of component carriers (CCs) are set.

One aspect of the present disclosure is a terminal that includes a receiver (control signal/reference signal processor 240) that receives downlink control information from a network, and a controller (controller 270) that applies slot format indicated by the downlink control information to a plurality of component carriers.

BRIEF DESCRIPTION OF DRAWINGS

FIG. 4 is a functional block diagram illustrating a configuration of UE 200.

FIG. 6 illustrates a configuration example of SlotFormat-CombinationsPerCell according to an operation example 1-1-2.

FIG. 7 illustrates a configuration example of a slot format indicator.

DESCRIPTION OF EMBODIMENTS

Figure 1:
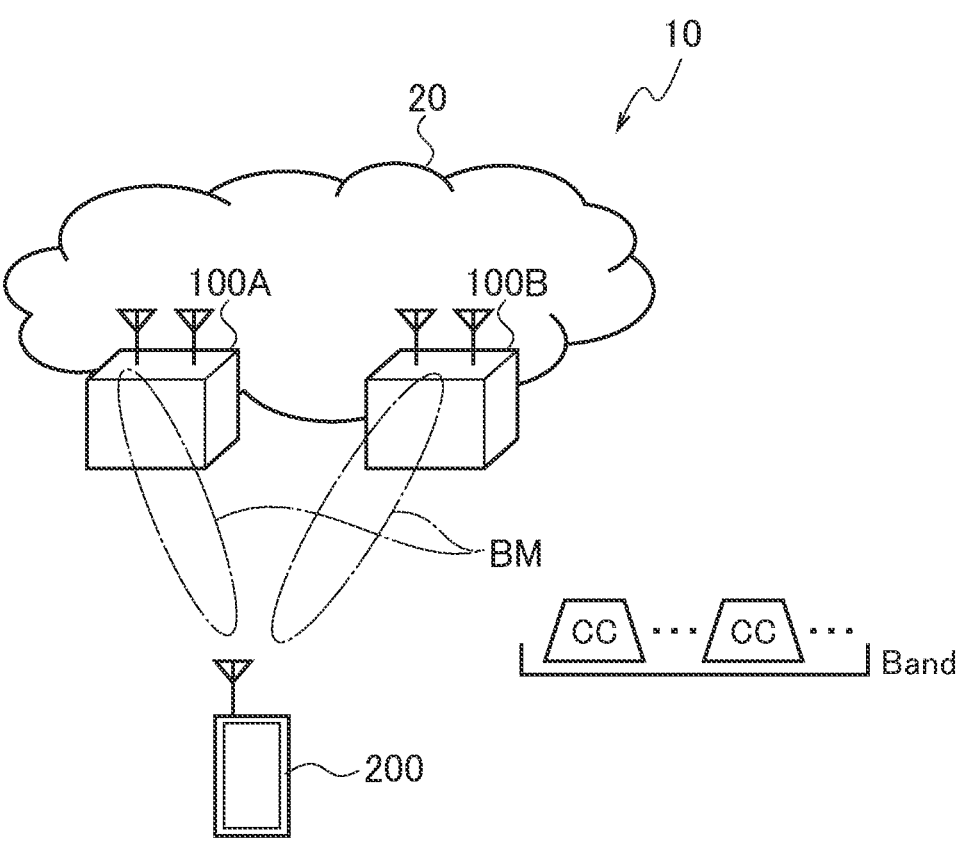
FIG. 1 illustrates an overall schematic configuration of a radio communication system 10.

Hereinafter, embodiments of the present disclosure will be described with reference to the drawings. The same functions and configurations are designated by the same or similar reference numerals, and description thereof will be omitted as appropriate.

(1) Overall Schematic Configuration of Radio Communication System

FIG. 1 illustrates an overall schematic configuration of a radio communication system 10 according to the present embodiment. The radio communication system 10 is a radio communication system complying with 5G New Radio (NR), and includes a Next Generation-Radio Access Network 20 (hereinafter, NG-RAN 20) and a terminal 200 (hereinafter, UE 200).

The radio communication system 10 may be a radio communication system according to a system called Beyond 5G, 5G Evolution, or 6G.

The NG-RAN 20 includes a radio base station 100A (hereinafter, gNB100A) and a radio base station 100B (hereinafter, gNB100B). Note that the specific configuration of the radio communication system 10 including the number of gNBs and UEs is not limited to the example illustrated in FIG. 1.

The NG-RAN 20 actually includes a plurality of NG-RAN Nodes, specifically, gNB (or ng-eNB), and is connected to a 5G-compliant core network (5GC, not illustrated). Note that the NG-RAN 20 and 5GC may be simply expressed as "network".

The gNB100A and gNB100B are radio base stations complying with 5G, and perform radio communication according to 5G with the UE 200. The gNB100A, the gNB100B, and the UE 200 control radio signals transmitted from a plurality of antenna elements to support Massive Multiple-Input Multiple-Output (MIMO) that generates a beam BM with higher directivity, a carrier aggregation (CA) used by bundling a plurality of component carriers (CCs), and dual connectivity (DC) in which simultaneous communication is performed between the UE and each of the two NG-RAN nodes, and the like.

Figure 2:
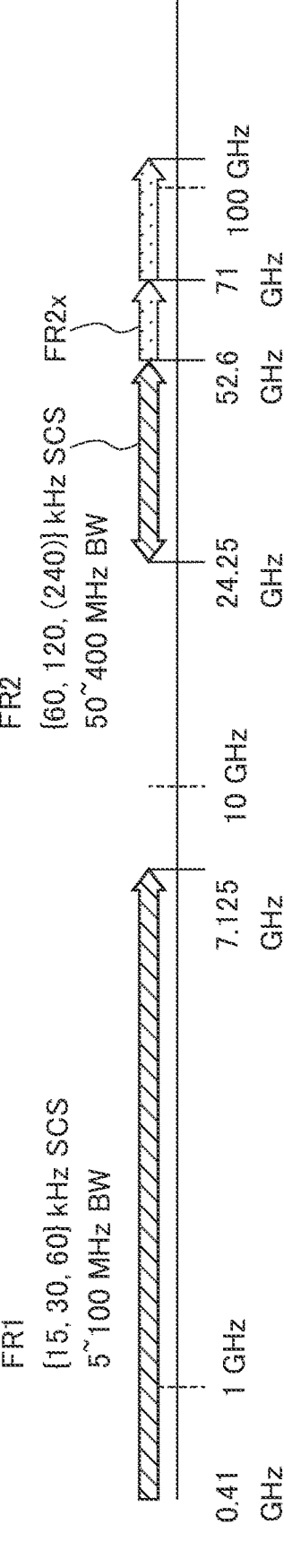
FIG. 2 illustrates frequency ranges used in the radio communication system 10.

In addition, the radio communication system 10 supports a plurality of frequency ranges (FR). FIG. 2 illustrates frequency ranges used in the radio communication system 10.

As illustrated in FIG. 2, the radio communication system 10 supports FR1 and FR2. The frequency bands of each FR are as follows.

FR1: 410 MHz to 7.125 GHz

FR2: 24.25 GHz to 52.6 GHz

In FR1, 15, 30, or 60 kHz Sub-Carrier Spacing (SCS) is used, and a bandwidth (BW) of 5 to 100 MHz may be used. FR2 is in a frequency range higher than FR1, and may use SCS of 60 or 120 kHz (240 kHz may be included) and bandwidth of 50 to 400 MHz (BW).

Note that SCS may be interpreted as numerology. The numerology is defined in 3GPP TS38.300 and corresponds to one subcarrier spacing in the frequency domain.

Furthermore, the radio communication system 10 also supports a frequency band higher than the FR2 frequency band. Specifically, the radio communication system 10 supports a frequency band exceeding 52.6 GHz and up to 71 GHz. Such a high frequency band may be called "FR2x" for convenience.

In order to solve such a problem, when using a band exceeding 52.6 GHz, Cyclic Prefix-Orthogonal Frequency Division Multiplexing (CP-OFDM)/Discrete Fourier Transform-Spread (DFT-S-OFDM) having a larger Sub-Carrier Spacing (SCS) may be applied.

Figure 3:
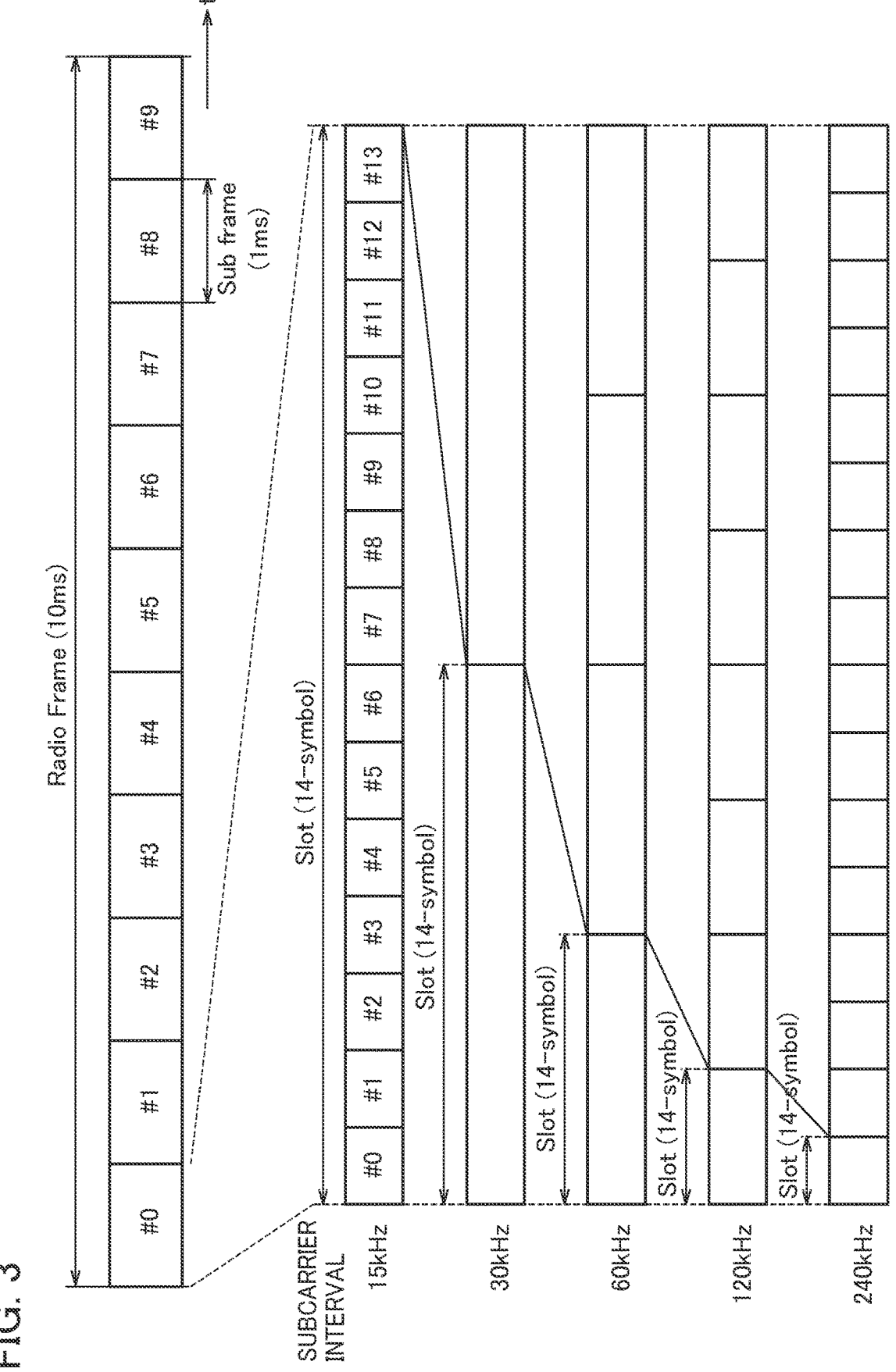
FIG. 3 illustrates a configuration example of radio frames, sub-frames, and slots used in the radio communication system 10.

FIG. 3 illustrates a configuration example of a radio frame, sub-frames, and slots used in the radio communication system 10.

As illustrated in FIG. 3, one slot is constituted by 14 symbols, and the larger (wider) the SCS, the shorter the symbol period (and the slot period). The SCS is not limited to the intervals (frequencies) illustrated in FIG. 3. For example, 480 kHz, 960 kHz, or the like may be used.

4

A BWP may be interpreted as a consecutive set of Physical Resource Blocks (PRBs) selected from a consecutive sub-set of common resource blocks for a given numerology on a given carrier.

The BWP information (bandwidth, frequency position, subcarrier spacing (SCS)) that the UE 200 should use for radio communication can be set in the UE 200 by using upper layer signaling (for example, signaling of a radio resource control layer (RRC)). A different BWP may be set for each UE 200 (terminal). The BWP may be changed by upper layer signaling or lower layer signaling which is specifically physical layer (L1) signaling (such as DCI which will be described later).

The radio communication system 10 supports a plurality of CCs for CA to achieve higher throughput. For example, when the maximum CC bandwidth is 400 MHz, up to 32 CCs can be arranged in FR2x, specifically, the frequency band of 57 GHz to 71 GHz. Note that the maximum number of CCs to be set may exceed or be equal to or less than 32.

Furthermore, the radio communication system 10 may support dynamic slot format indication (SFI) of a plurality of CCs via a single downlink control information (DCI). That is, in the radio communication system 10, the slot format (SF) applied to a plurality of CCs using the single DCI can be notified. Note that the details of the slot format indication using the single DCI will be described later.

The slot format (SF) can indicate how to use each symbol in one slot. Specifically, the symbols used for the uplink (UL) and the symbols used for the downlink (DL) in a specific slot can be defined.

One slot may be divided into a plurality of segments of consecutive symbols that can be used as DL, UL, or flexible (F). Flexible can be used as DL or UL.

Table 1 illustrates an example of the slot format. Such a slot format is specified in 3GPP TS 38.213, section 11.1.

TABLE 1

| Format | Symbol number in a slot | | | | | | | | | | | | | |
|--------|---|---|---|---|---|---|---|---|---|---|---|---|---|---|
|  | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |

.
.
.

In addition, the number of symbols forming one slot is not necessarily 14 symbols (for example, 28 or 56 symbols). Furthermore, the number of slots per sub-frame may vary depending on the SCS.

Note that the time direction (t) illustrated in FIG. 3 may be called a time domain, a symbol period, symbol time, or the like. Furthermore, the frequency direction may be called a frequency domain, a resource block, a subcarrier, a bandwidth part (BWP), or the like.

In addition, the DCI may include the following information:

(i) Uplink (UL) resource allocation (persistent or non-persistent)

(ii) Description of downlink (DL) data transmitted to the UE 200

The DCI may be an information set capable of scheduling a downlink data channel (for example, Physical Downlink Shared Channel (PDSCH)) or an uplink data channel (for example, Physical Uplink Shared Channel (PUSCH)). Such DCI may especially be called scheduling DCI.

In addition, the DCI is also used for notification of the slot format described above (Format 2_0).

(2) Functional Block Configuration of Radio Communication System

Next, the functional block configuration of the radio communication system 10 is described. Specifically, the functional block configuration of the UE 200 is described.

FIG. 4 is a functional block configuration diagram of the UE 200. As illustrated in FIG. 4, the UE 200 includes a radio signal transmitter/receiver 210, an amplifier 220, a modulator/demodulator 230, a control signal/reference signal processor 240, an encoder/decoder 250, a data transmitter/receiver 260, and a controller 270.

The radio signal transmitter/receiver 210 transmits/receives a radio signal according to NR. The radio signal transmitter/receiver 210 supports Massive MIMO, CA used by bundling a plurality of CCs, DC performing simultaneous communication between UE and each of the two NG-RAN nodes, and the like.

The amplifier 220 is constituted by a Power Amplifier (PA)/Low Noise Amplifier (LNA) or the like. The amplifier 220 amplifies the signal output from the modulator/demodulator 230 to a predetermined power level. In addition, the amplifier 220 amplifies an RF signal output from the radio signal transmitter/receiver 210.

The modulator/demodulator 230 executes data modulation/demodulation, sets transmission power, allocates resource blocks, and so on for each predetermined communication destination (gNB 100A or another gNB). To the modulator/demodulator 230, Cyclic Prefix-Orthogonal Frequency Division Multiplexing (CP-OFDM)/Discrete Fourier Transform-Spread (DFT-S-OFDM) may be applied. In addition, DFT-S-OFDM may be used not only in the uplink (UL) but also in the downlink (DL).

The control signal/reference signal processor 240 executes processing regarding various control signals transmitted to and received by the UE 200 and various reference signals transmitted to and received by the UE 200.

Specifically, the control signal/reference signal processor 240 receives various control signals transmitted from the gNB 100A via a predetermined control channel, for example, control signals of the radio resource control layer (RRC). In addition, the control signal/reference signal processor 240 transmits various control signals to the gNB 100A via a predetermined control channel.

The control signal/reference signal processor 240 executes processing using a reference signal (RS) such as a demodulation reference signal (DMRS) and a phase tracking reference signal (PTRS).

DMRS is a reference signal (pilot signal) known for estimating a fading channel used for data demodulation between the terminal-specific base station and the terminal. PTRS is a terminal-specific reference signal for the purpose of estimating phase noise, which is a problem in high frequency bands.

Note that, in addition to DMRS and PTRS, the reference signal may include Channel State Information-Reference Signal (CSI-RS), Sounding Reference Signal (SRS), Positioning Reference Signal (PRS) for position information.

In addition, the channel includes a control channel and a data channel. The control channel includes a Physical Downlink Control Channel (PDCCH), a Physical Uplink Control Channel (PUCCH), a Random Access Channel (RACH), a Downlink Control Information (DCI) including Random Access Radio Network Temporary Identifier (RA-RNTI), a Physical Broadcast Channel (PBCH), and the like.

The data channel includes a Physical Downlink Shared Channel (PDSCH), a Physical Uplink Shared Channel (PUSCH), and the like. Data means data transmitted via a data channel. The data channel may be replaced with a shared channel.

In the present embodiment, the control signal/reference signal processor 240 receives downlink control information (DCI) from the network. In the present embodiment, the control signal/reference signal processor 240 constitutes a receiver.

Specifically, the control signal/reference signal processor 240 can receive a plurality of types (formats) of DCI including the scheduling DCI. The DCI format may include PUSCH and PDSCH scheduling, slot formats, PUCCH and PUSCH Transmit Power Control (TPC) commands, and the like. More specifically, the DCI format specified in Section 7.3.1 of 3GPP TS38.212 may be targeted.

The encoder/decoder 250 executes data division/concatenation, channel coding/decoding, and the like for each predetermined communication destination (gNB 100A or another gNB).

Specifically, the encoder/decoder 250 divides the data output from data transmitter/receiver 260 into predetermined sized data, and executes channel coding on the divided data. In addition, the encoder/decoder 250 decodes the data output from the modulator/demodulator 230 and connects the decoded data.

The data transmitter/receiver 260 executes transmission/reception of Protocol Data Unit (PDU) and Service Data Unit (SDU). Specifically, the data transmitter/receiver 260 executes data assembly/disassembly of PDU/SDU in a plurality of layers (medium access control layer (MAC), radio link control layer (RLC), packet data convergence protocol layer (PDCP), and the like). In addition, the data transmitter/receiver 260 executes data error correction and retransmission control based on hybrid ARQ (Hybrid automatic repeat request).

The controller 270 controls each functional block that forms the UE 200. Particularly, in the present embodiment, the controller 270 supports dynamic slot format indication (SFI) of a plurality of component carriers (CC) using downlink control information (DCI).

Specifically, the controller 270 can apply the slot format (SF) indicated by one (single) DCI received via the control signal/reference signal processor 240 to a plurality of component carriers. That is, the controller 270 can apply the SF according to SFI indicated by the DCI to a plurality of CCs.

Note that the SFI value included in the single DCI may be commonly applied to a plurality of CCs transmitted and received by the radio signal transmitter/receiver 210. The plurality of CCs may be all CCs transmitted/received by the radio signal transmitter/receiver 210, or some CCs may be excluded.

Alternatively, the controller 270 may apply the slot format to a group including a plurality of CCs. Specifically, the controller 270 may apply the SFI included in one (single) DCI to the plurality of CCs in the group.

More specifically, in the upper layer, a plurality of CCs can be provided as a group. Here, the SFI included in the DCI may be commonly applied to the group.

Note that the settings of the upper layer for the group of the plurality of CCs may be the same as the group of CCs for other purposes (for example, the group of CCs targeted for BWP switching based on the DCI). Furthermore, the slot format may be applied to a specific group among the groups of CCs for other purposes (for example, the CC group that supports the CCs in the active BWP, or the CC group to which the transport block (TB) is mapped).

As described above, the plurality of CCs may be all CCs transmitted/received by the radio signal transmitter/receiver 210, but the following restrictions may be added.

For example, the plurality of CCs to which the single DCI is commonly applied may be limited to CCs that are contiguous (may be called consecutive) in the same frequency band. That is, the target CCs may be contiguous in the same frequency band. Note that three or more CCs may be targeted as long as they are contiguous (consecutive).

In addition, it is preferable that the upper layer settings regarding the slot format (or the slot format indication) be the same among the plurality of CCs. The flexible symbol (F) may be excluded, and the settings of the upper layer do not have to be the same among the plurality of CCs.

(3) Operation of Radio Communication System

Next, the operation of the radio communication system 10 is described. Specifically, the operation regarding the application of the slot format to the plurality of CCs using the single DCI is described.

(3.1) Assumption

As described above, the radio communication system 10 supports the frequency band (FR2x) exceeding 52.6 GHz and up to 71 GHz. High frequency bands such as FR2x have essential differences from FR1 and FR2 in the following points:

(Channel/Radio Wave Propagation)

Expansion of usable bandwidth (in a case of approximately 13 GHz (for 57 to 71 GHz unlicensed))

Low delay spread due to large path-loss due to Non-Line Of Sight (NLOS)

(Device (Terminal))

Small size antenna element according to wavelength ((massive) antenna using the same)

High directivity based on analog beamforming (narrow beam width)

Lower efficiency of power amplifier (increased peak-to-average power ratio (PAPR))

Increased phase noise (applicability of higher SCS and shorter symbol time)

In addition, the wider the available bandwidth, the more likely that more CCs are set, unless a very wide CC bandwidth is supported. As described above, when the maximum CC bandwidth is 400 MHz as in FR2, a maximum of 32 CCs can be arranged within the frequency band of 57 GHz to 71 GHz.

In the carrier aggregation (CA), the number of CCs that can be set is limited. Specifically, in Release-15 and 16 of 3GPP, the maximum number of CCs that can be set for the UE 200 is 16 in DL and UL, respectively (Chapter 5.4.1 of 3GPP 38.300).

On the other hand, the physical layer (L1, PHY) and the medium access control layer (MAC) are set for each CC. In Release-15 and 16 of 3GPP, the single DCI can schedule only one CC, so that many DCIs are required to schedule many CCs. This may cause a tight restriction of the capacity of PDCCH.

In addition, one transport block (TB) can be transmitted only by one CC (that is, one TB cannot be mapped to a plurality of CCs), and many CCs need many Hybrid Automatic repeat request (HARQ) Acknowledgment (ACK) bits.

Furthermore, the slot format (SF) is also displayed for each CC. For example, in the plurality of CCs, if the transmission (Tx)/reception (Rx) direction needs to be changed according to service requirements (due to delay or the like), the individual indication (SFI) for each CC is required.

Regardless of such restrictions, it is assumed that the channel characteristics of the plurality of CCs within a single wide band do not differ much. Therefore, it is assumed that the operation in the separate PHY and MAC layers for each CC is not always necessary and not efficient.

In the following, taking these assumptions into account, the operation for realizing efficient scheduling of CCs using the DCI, even in a case where many CCs are set, is described.

(3.2) Operation Overview

To achieve high throughput, the radio communication system 10 can reduce overhead of the DL control channel and reliably avoid PDCCH capacity tightness, even when many CCs are supported for the CA.

Specifically, the radio communication system 10 supports dynamic slot format indication (SFI) of a plurality of CCs via a single DCI. That is, the SFI indicated by the single DCI may be commonly applied to a plurality of CCs.

Alternatively, the upper layer may include a plurality of CCs constituted as a group. Here, the SFI included in the DCI may be commonly applied to the group.

In this case, as described above, the settings regarding the upper layer for the group of a plurality of CCs may be the same as the settings for a group of CCs for other purposes (for example, a group of CCs subject to BWP switching based on DCI, a group of CCs that supports the CCs in the active BWP, or a group of CCs to which the transport block (TB) is mapped).

Note that the plurality of CCs to which the single DCI is commonly applied may be limited to CCs that are contiguous (or may be called consecutive) in the same frequency band.

In addition, it is preferable that the upper layer settings regarding the slot format (or the slot format indication) be the same among the plurality of CCs. The flexible symbol (F) may be excluded, and the settings of the upper layer do not have to be the same among the plurality of CCs.

Figure 5:
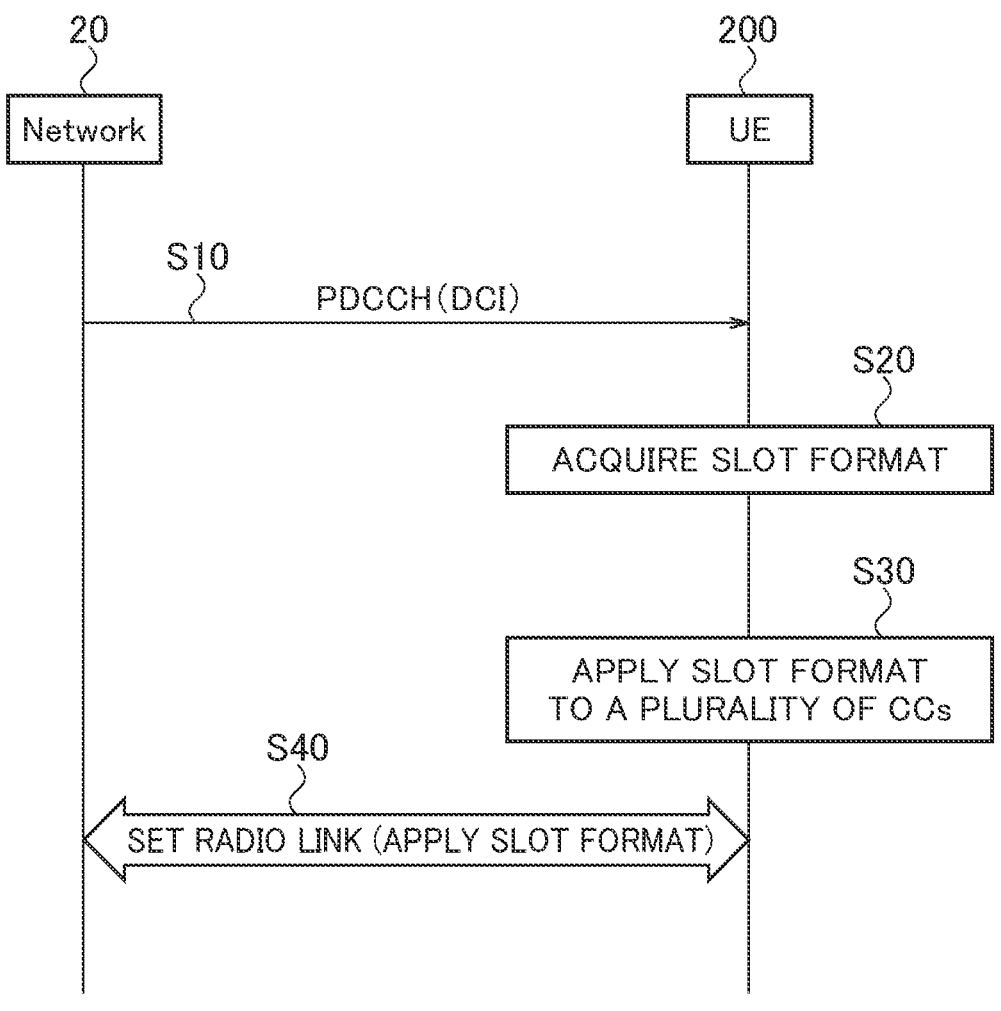
FIG. 5 illustrates an example of a communication sequence regarding slot format application to a plurality of CCs using single DCI.

FIG. 5 illustrates an example of a communication sequence regarding slot format application to a plurality of CCs using the single DCI according to the present embodiment. Here, it is assumed that the UE 200 has set a plurality of CCs to execute CA.

As illustrated in FIG. 5, the network transmits the PDCCH to the UE 200 (S10). The DCI for notification of the slot format may be included in the PDCCH.

The UE 200 receives the PDCCH and acquires the slot format included in the DCI. Specifically, the UE 200 acquires the SFI value included in the DCI (S20).

The UE 200 applies the acquired SFI value to a plurality of CCs that have been set (S30). Specifically, the UE 200 applies the same slot format to a plurality of CCs according to the slot format specified by the SFI value (see Table 1).

The UE 200 applies the same slot format to the plurality of CCs, sets a radio link with the network (gNB 100A or gNB 100B), and executes radio communication (S40).

(3.3) Operation Example

In the present operation example, the value of the SFI field (slot format) included in the DCI is commonly applied to the plurality of CCs.

That is, the DCI includes the single SFI field applied to the plurality of CCs. The slot format (Table 1) specified by each SFI field is applied to the relevant CCs.

The slot format indicated by the DCI may be applied in accordance with any one of the following:

(Operation Example 1-1): The slot format indicated by the DCI is applied to all CCs set as a group.

Here, in some CCs, the SF may be applied even if the SCS of the active DL BWP and/or the active UL BWP is not the same as the reference SCS.

Furthermore, in the operation example 1-1, the following operations may be applied:

(Operation Example 1-1-1): The upper layer settings for the group of a plurality of CCs are common to the settings for the CC groups for other purposes (scheduling, HARQ-ACK bundling, Transmission configuration Indication (TCI) switching, BWP switching, or the like).

Furthermore, the slot format may be applied to a specific group among the groups of CCs for other purposes (for example, the CC group that supports the CCs in the active BWP, or the CC group to which the transport block (TB) is mapped).

(Operation example 1-1-2): The settings of the upper layer regarding the group of a plurality of CCs are separated from the groups of CCs for other purposes.

For example, the information element (IE) of SlotFormat-CombinationsPerCell may be interpreted as follows.

FIG. 6 illustrates a configuration example of SlotFormat-CombinationsPerCell according to Operation Example 1-1-2. As illustrated in FIG. 6, in SlotFormatCombinaftionsPer-Cell, the maximum number of CCs included in a group (maxNrofCellsPerGroup) may be defined (see the underlined portion in FIG. 6).

Alternatively, IE of SlotFormatCombinationsPerCell may be changed to the name of SlotFormatCombinationPerCell-Group, and the maximum number of CCs included in the group may be specified.

(Operation Example 1-2): The slot format is applied to all CCs in the group in which the SCS of the active DL BWP and/or the active UL BWP is the same as the reference SCS (Reference SCS).

In this case, the reference SCS may be set based on the SCS of the active BWP in the upper layer or a specific CC. The specific CC may indicate, for example, the CC of the primary cell (PCell) (or the primary secondary cell (PS-Cell)), the CC with the lowest index, the secondary cell (SCell) to which the PUCCH is transmitted, and the CC to which the DCI giving a notification of the slot format is transmitted. In addition, the reference SCS may be different in UL and DL.

In addition, the application of the slot format to the plurality of CCs according to the single DCI, may be operated in accordance with any of the following:

(Operation Example 1-a): Only applicable to contiguous CCs in the same frequency band.

(Operation Example 1-b): Only applicable to contiguous CCs or non-contiguous CCs within the same frequency band.

(Operation Example 1-c): Only applicable to CCs in the frequency range (FR) (for example, the frequency range of 52.6 GHz or higher, or 71 GHz or higher).

(Operation Example 1-d): Applicable to any CCs so long as the parameters are the same for any one of the slot format below:

TDD-UL-DL-ConfigCommon, TDD-UL-DL-ConfigDedicated subcarrierSpacing, subcarrierSpacing2, positionInDCI, slotFormatCombination In addition, for some slots, the DL symbol and the UL symbol for each slot may be the same among CCs. That is, in some slots, a symbol set as a DL/UL symbol in one CC may be set as a flexible symbol in another CC.

Note that the settings of the reference CC may be different from the settings of other CCs. Specifically, the reference CC may be set by an upper layer or may be set based on a specific CC. As described above, the specific CC may indicate, for example, the CC of PCell (or PSCell), the CC with the lowest index, the SCell to which the PUCCH is transmitted, and the CC to which the DCI giving a notification of the slot format is transmitted.

Furthermore, the application of the slot format to a plurality of CCs according to the single DCI may be operated in accordance with any of the following:

(Operation Example 1-X): The upper layer settings for the slot formats of a plurality of CCs are identical.

Specifically, at least one of the following parameters relating to any one of the following slot format may be the same among CCs.

TDD-UL-DL-ConfigCommon, TDD-UL-DL-ConfigDedicated subcarrierSpacing, subcarrierSpacing2, positionInDCI, slotFormatCombination In addition, for some slots, the DL symbol and the UL symbol for each slot may be the same among CCs. That is, in some slots, a symbol set as a DL/UL symbol in one CC may be set as a flexible symbol in another CC.

Note that the settings of the reference CC may be different from the settings of other CCs. Specifically, the reference CC may be set based on the upper layer or a specific CC. As described above, the specific CC may indicate, for example, the PCell (or SCell) CC, the CC with the lowest index, the SCell to which the PUCCH is transmitted, and the CC to which the DCI giving the notification of the slot format is transmitted.

(Operation Example 1-Y): The UE 200 does not assume that the slot format (as described above) is set for a plurality of CCs in the group.

The set CC can be set as the reference CC.

In addition, regarding the capability (Capability) of the UE 200 and the settings of RRC, the operation may be performed according to any of the following:

The UE 200 reports to the network to support the slot format application for a plurality of CCs via the single DCI (UE, FR, or per band).

In addition, the UE 200 may report capabilities regarding the number of cell groups and may support separate SFI in the DCI.

The network (gNB) explicitly sets slot format application to a plurality of CCs via a single DCI for each cell group (CG) (in CellGroupconfig), each cell (in ServingCellconfig), each BWP, or each search space.

As described above, the slot format can be notified using DCI Format 2_0 (see 3GPP TS38.212).

Figure 7:
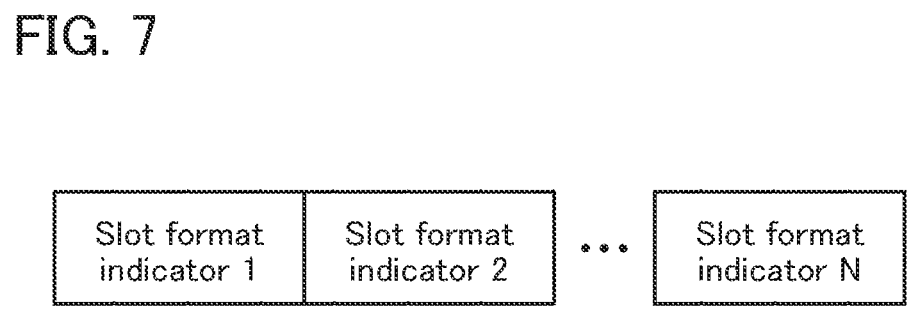

FIG. 7 illustrates a configuration example of a slot format indicator. The bit field of the indicator of a plurality of slot formats indicated by DCI Format 2_0 can include up to #1, #2, . . . N, as illustrated in FIG. 7. The size of Format 2_0 can be set up to 128 bits depending on the upper layer.

For example, the slot format indicator 1 in FIG. 7 may be applied to cell group #a in which positionInDCI indicates the corresponding bit field, and the slot format indicator 2 may be applied to cell group #b in which positionInDCI indicates the corresponding bit field.

PositionInDCI may indicate the start position (the number of bits) of a 14-bit INT value applicable to the serving cell in the payload of the DCI, and may be a multiple of 14 (bits).

(3.4) Other Operations

The operation examples of the UE 200 have been mainly described above, but the UE 200 may further operate as described below.

For example, the UE200 may not assume to detect the DCI in which the slot format corresponding to a group (set) of specific symbols in the slot includes a field value of SFI indicating a specific transmission/reception direction (DL/UL) in the cell group. Specifically, the UE 200 may not assume to detect the DCI in the following manner:

To detect the DCI indicating that PDSCH or CSI-RS is received in the set of symbols in the slot notified as UL by the SFI for any CCs in the cell group.

To detect the DCI or a UL grant of Random Access Response (RAR) indicating that the PUSCH, the PUCCH, the PRACH, or the SRS is transmitted in a set of symbols in the slot notified as DL by the SFI for any CCs in the cell group.

To receive a notification that a set of symbols indicated as UL/DL by TDD-UL-DL-configCommon or TDD-UL-DL-configDedicated is DL/UL or flexible (F) by the SFI for any CCs in the cell group.

To receive a notification that a set of symbols indicated by the UE 200 as receiving SS/PBCH block by ssb-PositionsInBurst of System Information Block (SIB) 1 or ssb-PositionsInBurst of ServingCellconfigCommon is UL by the SFI for any CCs in the cell group.

To receive a notification that a set of slot symbols corresponding to a valid PRACH opportunity (RO) and a Ngap symbol prior to the valid PRACH RO is DL by the SFI for any CCs in the cell group, as described in Section 8.1 of 3GPP TS 38.213.

To receive a notification that a set of symbols in the slot indicated to the UE 200 by pdcch-configSIB1 of MIB for control resource sets (CORESET) for Type 0-PDCCH CSS is UL by the SFI for any CCs in the cell group.

To receive a notification that a set of symbols in the slot is DL or F by the SFI when the symbols corresponding to the repetition of PUSCH transmission activated by UL Type 2 grant PDCCH is included for any CCs in the cell group.

In addition, "any CCs in the cell group" may be replaced with "any CCs in the cell group other than Reference CC". That is, the behavior of the UE 200 may be different between the reference CC and other CCs.

The reference CC may be set by the upper layer, or may be set based on a specific CC (the CC of PCell (or PSCell), the CC with the lowest index, the SCell in which the PUCCH is transmitted, the CC to which the DCI giving a notification of the slot format is transmitted).

(3.5) CC Group

Figure 8:
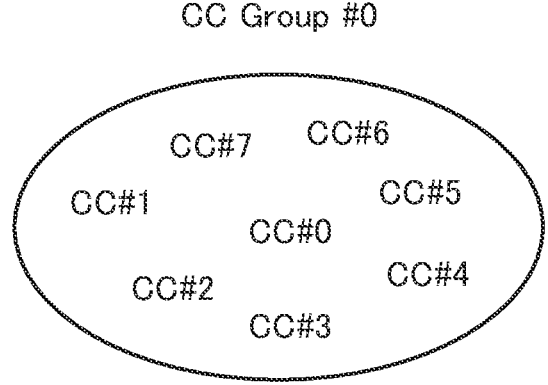
FIG. 8 is a diagram for explaining a CC group.
Figure 9:
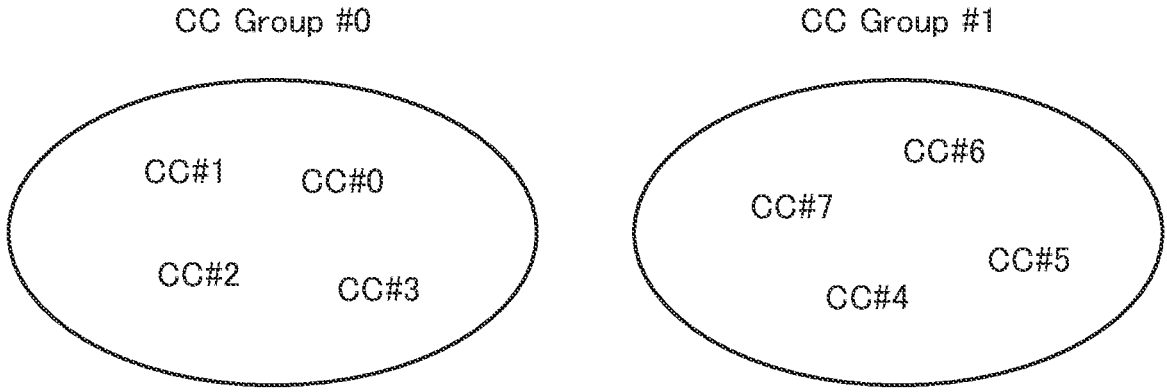
FIG. 9 is a diagram for explaining a CC group.

FIGS. 8 and 9 are diagrams for explaining the CC groups according to the present embodiment. As described above, the CC group includes a plurality of CCs.

As illustrated in FIG. 8, one CC group may be set. FIG. 8 illustrates a case where CC #0 to CC #7 are set in CC group #0. CC group #0 may be called a serving cell group. CC group #0 may be set by the upper layer parameters. For example, CC group #0 may be set by an RRC message. In the case where one CC group is set, a plurality of CCs included in the CC group may be predetermined.

As illustrated in FIG. 9, a plurality of CC groups may be set. FIG. 9 illustrates a case where CC #0 to CC #3 are set in CC group #0 and CC #4 to CC #7 are set in CC group #1. CC group #0 and CC group #1 may be called serving cell groups. CC group #0 and CC group #1 may be set by upper layer parameters. For example, CC group #0 and CC group #1 may be set by the RRC message.

In FIGS. 8 and 9, the CC group may be applied to the UE 200 by the information element included in the RRC message or may be applied to the UE 200 by the information element included in the DCI. The CC groups applied to the UE 200 may be a CC group selected from the CC groups set by the upper layer parameters. Application may be called enable or activate.

Similarly, the CC group may not be applied to the UE 200 by the information element included in the RRC message, and may not be applied to the UE 200 by the information element included in the DCI. The CC group that is not applied to the UE 200 may be a CC group selected from the CC groups set by the upper layer parameters. Non-application may be called disable or inactivate.

First, the plurality of CCs included in the CC group may be consecutive CCs in the intra-band. The plurality of CCs included in the CC group may be CCs included in the scheduling cell or CCs included in the search space of the PDCCH. The search space of the PDCCH may be defined by Radio Network Temporary Identifier (RNTI) such as System Information (SI)-RNTI, Random Access (RA)-RNTI, Temporary Cell (TC)-RNTI, Cell (C)-RNTI, Paging (P)-RNTI, Interruption (INT)-RNTI, Slot Format Indication (SFI)-RNTI, Transmit Power Control (TPC)-PUSCH-RNTI, TPC-PUCCH-RNTI, TPC-SRS-RNTI, Semi Persistent (SP)-Channel State Information (CSI)-RNTI, or the like. The plurality of CCs included in the CC group may be CCs to which the configuration of the serving cell is commonly applied. The settings of the serving cell may include TDD DL/UL configuration and SCS specific carrier list.

Second, the CC group may be set and applied for one purpose or operation. The CC group may be set and applied for two or more purposes or operations. The predetermined purpose or operation may include UL scheduling, DL scheduling, BWP switching, Transmission configuration Indicator (TCI) switching, and Slot Format Indicator (SFI).

A case where the CC group is set and applied for one purpose or operation is described with reference to the example illustrated in FIG. 9. For example, CC group #0 may be a group for UL scheduling, and CC group #1 may be a group for DL scheduling. CC group #0 may be a group for scheduling (UL and DL), and CC group #1 may be a group for BWP switching. CC group #0 may be a group for TCI switching, and CC group #1 may be a group for SFI. With such a configuration, it is possible to flexibly set the CC group and then improve the performance.

A case where a CC group is set and applied for two or more purposes or operations is described with reference to the example illustrated in FIG. 9. For example, CC group #0 may be a group for scheduling (UL and DL) and SFI, and CC group #1 may be a group for BWP switching and TCI switching. With such a configuration, the configuration of the gNB can be simplified.

(4) Action/Effect

According to the above-described embodiment, the following operational effects can be obtained. Specifically, the UE 200 can apply the slot format indicated by the DCI to a plurality of CCs. That is, the slot format indicated by a single DCI can be commonly applied to a plurality of CCs.

Therefore, even when a large number of CCs are set, such as when FR2x is used, efficient CC control using the DCI, specifically, dynamic slot format indication can be realized.

In the present embodiment, the UE 200 can apply the slot format to a group composed of a plurality of CCs. Therefore, for example, the same slot format can be collectively applied to a plurality of CCs included in groups having different purposes.

In the present embodiment, the plurality of target CCs may be limited to contiguous CCs in the same frequency band. Therefore, the slot format can be commonly applied to CCs that are assumed to have relatively similar characteristics. This makes it possible to achieve both efficient CC control using the DCI and maintenance and improvement of radio quality.

In the present embodiment, the settings of the upper layer regarding the slot format can be the same among the plurality of target CCs. Therefore, the same slot format can be applied to the plurality of CCs having common characteristics.

(5) Other Embodiments

Although the embodiment has been described above, it is obvious to those skilled in the art that the embodiment is not limited to the above-described embodiment, and various modifications and improvements can be made.

Although the embodiment has been described above, it is obvious to those skilled in the art that the embodiment is not limited to the above-described embodiment, and various modifications and improvements can be made.

For example, in the above-described embodiment, use of a high frequency band such as FR2x is assumed, but use of such a high frequency band is not always necessary. That is, even when FR1 or FR2 is used, the slot format indicated by a single DCI as described above may be commonly applied to a plurality of CCs.

In addition, the plurality of CCs may be scheduled by being divided into a Primary Component Carrier (PCC), a Secondary Component Carrier (SCC), and the like.

In addition, the block diagram (FIG. 4) used for describing the embodiments illustrates blocks of functional units. Those functional blocks (structural components) are realized by a desired combination of at least one of hardware and software. How to fabricate each functional block is not particularly limited. That is, each functional block may be realized by one device coupled physically or logically. Alternatively, two or more devices separated physically or logically may be directly or indirectly connected (for example, in a wired or wireless manner) to each other, and each functional block may be realized by these plural devices. The functional blocks may be fabricated by combining software with the one device or the plurality of devices mentioned above.

Functions include judging, deciding, determining, calculating, computing, processing, deriving, investigating, searching, confirming, receiving, transmitting, outputting, accessing, resolving, selecting, choosing, establishing, comparing, assuming, expecting, regarding, broadcasting, notifying, communicating, forwarding, configuring, reconfiguring, allocating (mapping), assigning, and the like, but the functions are not limited thereto. For example, a functional block (structural component) performing the transmitting function may be called a transmitting unit or a transmitter. For any of the above, as described above, the realization method is not particularly limited to any one method.

Figure 10:
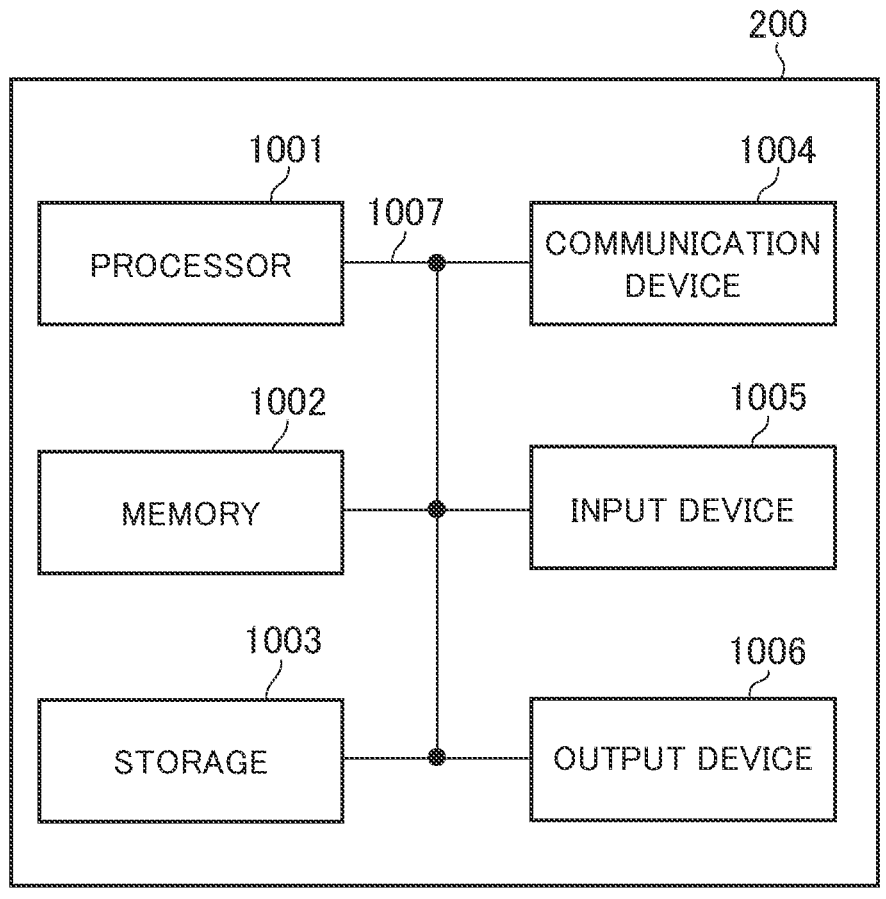
FIG. 10 illustrates an example of a hardware configuration of the UE 200.

Furthermore, the UE 200 described above can function as a computer that performs the processing of the radio communication method of the present disclosure. FIG. 10 illustrates an example of a hardware configuration of the UE 200. As illustrated in FIG. 10, the UE 200 can be constituted as a computer device including a processor 1001, a memory 1002, a storage 1003, a communication device 1004, an input device 1005, an output device 1006, a bus 1007, and the like.

Note that, in the following explanation, the term "device" can be replaced with a circuit, a device, a unit, or the like. Hardware configuration of the device can be provided by including one or a plurality of devices illustrated in the drawing, or can be constituted without including a part of the devices.

The functional blocks of the UE 200 (see FIG. 4) can be fabricated by any one of the hardware elements of the computer device or a combination of the hardware elements.

In addition, the processor 1001 performs computing by loading a predetermined software (computer program) on hardware such as the processor 1001 and the memory 1002, and realizes various functions of the US200 by controlling communication via the communication device 1004, and controlling reading and/or writing of data on the memory 1002 and the storage 1003.

The processor 1001, for example, operates an operating system to control the entire computer. The processor 1001 can be configured with a central processing unit (CPU) including an interface with a peripheral device, a control device, a computing device, a register, and the like.

In addition, the processor 1001 reads a computer program (computer program code), a software module, data, and the like from the storage 1003 and/or the communication device 1004 into the memory 1002, and executes various kinds of processing according to these. As the computer program, a computer program that is capable of executing on the computer at least a part of the operation described in the above embodiments is used. Alternatively, various kinds of processing described above can be executed by one processor 1001 or can be executed simultaneously or sequentially by two or more processors 1001. The processor 1001 can be implemented by using one or more chips. Alternatively, the computer program can be transmitted from a network via a telecommunication line.

The memory 1002 is a computer readable recording medium and is constituted, for example, with at least one of Read Only Memory (ROM), Erasable Programmable ROM (EPROM), Electrically Erasable Programmable ROM (EEPROM), Random Access Memory (RAM), and the like. The memory 1002 can be called register, cache, main memory (main memory), and the like. The memory 1002 can store therein a computer program (computer program codes), software modules, and the like that can execute the method according to the embodiment of the present disclosure.

The storage 1003 is a computer readable recording medium. Examples of the storage 1003 includes an optical disk such as Compact Disc ROM (CD-ROM), a hard disk drive, a flexible disk, a magneto-optical disk (for example, a compact disk, a digital versatile disk, Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or radio network. The communication device 1004 is also called, for example, a network device, a network controller, a network card, a communication module, and the like.

The communication device 1004 includes a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

In addition, the respective devices, such as the processor 1001 and the memory 1002, are connected to each other with the bus 1007 for communicating information thereamong. The bus 1007 can be constituted by a single bus or can be constituted by separate buses between the devices.

Furthermore, the device is constituted to include hardware such as a microprocessor, a digital signal processor (Digital Signal Processor: DSP), Application Specific Integrated Circuit (ASIC), Programmable Logic Device (PLD), and Field Programmable Gate Array (FPGA). Some or all of these functional blocks may be realized by the hardware. For example, the processor 1001 may be implemented by using at least one of these hardware.

In addition, notification of information is not limited to that described in the above aspect/embodiment, and may be performed by using a different method. For example, the notification of information may be performed by physical layer signaling (for example, Downlink Control Information (DCI), Uplink Control Information (UCI), upper layer signaling (for example, RRC signaling, Medium Access Control (MAC) signaling, broadcasting information (Master Information Block (MIB), System Information Block (SIB)), other signals, or a combination of these. The RRC signaling may be called RRC message, for example, or can be RRC Connection Setup message, RRC Connection Reconfiguration message, or the like.

Each of the above aspects/embodiments can be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system that is expanded based on these. Furthermore, a plurality of systems may be combined (for example, a combination of at least one of the LTE and the LTE-A with the 5G).

As long as there is no inconsistency, the order of processing procedures, sequences, flowcharts, and the like of each of the above aspects/embodiments in the present disclosure may be exchanged. For example, the various steps and the sequence of the steps of the methods described above are exemplary and are not limited to the specific order mentioned above.

The specific operation that is performed by the base station in the present disclosure may be performed by its upper node in some cases. In a network constituted by one or more network nodes having a base station, it is obvious that the various operations performed for communication with the terminal may be performed by at least one of the base station and other network nodes other than the base station (for example, MME, S-GW, and the like may be considered, but not limited thereto). In the above, an example in which there is one network node other than the base station is described; however, a combination of a plurality of other network nodes (for example, MME and S-GW) may be used.

Information and signals (information and the like) can be output from an upper layer (or lower layer) to a lower layer (or upper layer), or may be input and output via a plurality of network nodes.

The input/output information can be stored in a specific location (for example, a memory) or can be managed with a management table. The information to be input/output can be overwritten, updated, or added. The information can be deleted after outputting. The inputted information can be transmitted to another device.

The determination may be made by a value (0 or 1) represented by one bit or by Boolean value (Boolean: true or false), or by comparison of numerical values (for example, comparison with a predetermined value).

Each aspect/embodiment described in the present disclosure may be used separately or in combination, or may be switched in accordance with the execution. In addition, notification of predetermined information (for example, notification of "being X") is not limited to being performed explicitly, it may be performed implicitly (for example, without notifying the predetermined information).

Instead of being called software, firmware, middleware, microcode, hardware description language, or some other name, software should be interpreted broadly to mean instruction, instruction set, code, code segment, computer program code, computer program, sub-computer program, software module, application, software application, software package, routine, subroutine, object, executable file, execution thread, procedure, function, and the like.

Furthermore, software, instruction, information, and the like may be transmitted and received via a transmission medium. For example, when a software is transmitted from a website, a server, or some other remote source by using at least one of a wired technology (coaxial cable, fiber optic cable, twisted pair, Digital Subscriber Line (DSL), or the like) and a radio technology (infrared light, microwave, or the like), then at least one of these wired and radio technologies is included within the definition of the transmission medium.

Information, signals, or the like mentioned above may be represented by using any of a variety of different technologies. For example, data, instruction, command, information, signal, bit, symbol, chip, or the like that may be mentioned throughout the above description may be represented by voltage, current, electromagnetic wave, magnetic field or magnetic particle, optical field or photons, or a desired combination thereof.

It should be noted that the terms described in present disclosure and terms necessary for understanding the present disclosure may be replaced by terms having the same or similar meanings. For example, at least one of a channel and a symbol may be a signal (signaling). Also, a signal may be a message. Furthermore, a component carrier (Component Carrier: CC) may be called a carrier frequency, a cell, a frequency carrier, or the like.

The terms "system" and "network" used in the present disclosure can be used interchangeably.

Furthermore, the information, the parameter, and the like described in the present disclosure can be represented by an absolute value, can be expressed as a relative value from a predetermined value, or can be represented by corresponding other information. For example, the radio resource can be indicated by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information element can be identified by any suitable name, the various names assigned to these various channels and information elements shall not be restricted in any way.

In the present disclosure, it is assumed that "base station (Base Station: BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. The base station may also be called with the terms such as a macro cell, a small cell, a femtocell, or a pico cell.

The base station can accommodate one or more (for example, three) cells (also called sectors). In a configuration in which the base station accommodates a plurality of cells, the entire coverage area of the base station can be divided into a plurality of smaller areas. In each such a smaller area, communication service can be provided by a base station subsystem (for example, a small base station for indoor use (Remote Radio Head: RRH)).

The term "cell" or "sector" refers to a part or all of the coverage area of a base station and/or a base station subsystem that performs communication service in this coverage.

In the present disclosure, the terms "mobile station (Mobile Station: MS)", "user terminal", "user equipment (User Equipment: UE)", "terminal" and the like can be used interchangeably.

The mobile station is called by the persons skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or with some other suitable term.

At least one of a base station and a mobile station may be called a transmitting device, a receiving device, a communication device, or the like. Note that, at least one of a base station and a mobile station may be a device mounted on a moving body, a moving body itself, or the like. The moving body may be a vehicle (for example, a car, an airplane, or the like), a moving body that moves unmanned (for example, a drone, an automatically driven vehicle, or the like), or a robot (manned type or unmanned type). At least one of a base station and a mobile station can be a device that does not necessarily move during the communication operation. For example, at least one of a base station and a mobile station may be an Internet of Things (IoT) device such as a sensor.

In addition, a base station in the present disclosure may be replaced with a mobile station (user terminal, hereinafter the same). For example, each of the aspects/embodiments of the present disclosure may be applied to a configuration that allows a communication between a base station and a mobile station to be replaced with a communication between a plurality of mobile stations (for example, may be called Device-to-Device (D2D), Vehicle-to-Everything (V2X), or the like). In this case, the mobile station may have the function of the base station. Words such as "uplink" and "downlink" may also be replaced with wording corresponding to inter-terminal communication (for example, "side"). For example, terms an uplink channel, a downlink channel, or the like may be replaced with a side channel.

Likewise, a mobile station in the present disclosure may be replaced with a base station. In this case, the base station may have the function of the mobile station.

A radio frame may be constituted by one or more frames in the time domain. One frame or a plurality of frames in the time domain may be called a sub-frame. A sub-frame may also be constituted by one or more slots in the time domain. The sub-frame may have a fixed time length (for example, 1 ms) that does not depend on the numerology.

The numerology may be a communication parameter applied to at least one of transmission and reception of a signal or channel. The numerology may indicate, for example, at least one of SubCarrier Spacing (SCS), a bandwidth, a symbol length, a cyclic prefix length, a transmission time interval (TTI), number of symbols per TTI, radio frame configuration, specific filtering processing performed by the transmitter/receiver in the frequency domain, specific windowing processing performed by the transmitter/receiver in the time domain, and the like.

A slot may be constituted with one or more symbols (Orthogonal Frequency Division Multiplexing (OFDM) symbols, Single Carrier Frequency Division Multiple Access (SC-FDMA) symbols, and the like) in the time domain. A slot may be a time unit based on numerology.

The slot may include a plurality of mini-slots. Each mini-slot may be constituted by one or more symbols in the time domain. Also, the mini-slot may be called a sub-slot. The mini-slot may be constituted by a smaller number of symbols than the slot. The PDSCH (or PUSCH) transmitted in time units larger than mini-slots may be called the PDSCH (or PUSCH) mapping, type A. The PDSCH (or PUSCH) transmitted using a mini-slot may be called the PDSCH (or PUSCH) mapping, type B.

Each of the radio frame, the sub-frame, the slot, the mini-slot, and the symbol represents a time unit in transmitting a signal. Different names may be used corresponding to the radio frame, the sub-frame, the slot, the mini-slot, and the symbol, respectively.

For example, one sub-frame may be called a transmission time interval (TTI), a plurality of consecutive sub-frames may be called a TTI, or one slot or one mini-slot may be called a TTI. That is, at least one of the sub-frame and the TTI may be a sub-frame (1 ms) of the existing LTE, a period shorter than 1 ms (for example, 1-13 symbols), or a period longer than 1 ms. Note that the unit representing the TTI may be called a slot, a mini-slot, or the like instead of a sub-frame.

Here, the TTI refers to, for example, the minimum time unit of scheduling in radio communication. For example, in the LTE system, the base station performs scheduling to allocate radio resources (frequency bandwidth that can be used in each user terminal, transmission power, and the like) to each user terminal in units of TTI. Note that the definition of TTI is not limited to this.

The TTI may be a transmission time unit of a channel-encoded data packet (transport block), a code block, a codeword, or the like, or a processing unit for scheduling, link adaptation, or the like. Note that when the TTI is given, a time period (for example, the number of symbols) in which a transport block, a code block, a codeword, and the like are actually mapped may be shorter than the TTI.

Note that when one slot or one mini-slot is called TTI, one or more TTIs (that is, one or more slots or one or more mini-slots) may be the minimum time unit for scheduling. In addition, the number of slots (the number of mini-slots) constituting the minimum time unit of the scheduling may be controlled.

TTI having a time length of 1 ms may be called a normal TTI (TTI in LTE Rel. 8-12), a normal TTI, a long TTI, a normal sub-frame, a normal sub-frame, a long sub-frame, a slot, or the like. TTI shorter than the normal TTI may be called a shortened TTI, a short TTI, a partial TTI (partial or fractional TTI), a shortened sub-frame, a short sub-frame, a mini-slot, a sub-slot, a slot, or the like.

Note that the long TTI (for example, the normal TTI, the sub-frame, or the like) may be replaced with the TTI having a time length exceeding 1 ms, and the short TTI (for example, the shortened TTI or the like) may be replaced with the TTI having a TTI length less than the TTI length of the long TTI and equal to or longer than 1 ms.

A resource block (RB) is a resource allocation unit in the time domain and the frequency domain, and may include one or more consecutive subcarriers in the frequency domain. The number of subcarriers included in the RB may be the same regardless of the numerology, and may be, for example, 12. The number of subcarriers included in the RB may be determined based on the numerology.

In addition, the time domain of the RB may include one or more symbols, and may have a length of one slot, one mini-slot, one sub-frame, or one TTI. One TTI, one sub-frame, and the like may each be constituted with one or more resource blocks.

One or more RBs may be called a physical resource block (Physical RB: PRB), a subcarrier group (Sub-Carrier Group: SCG), a resource element group (Resource Element Group: REG), a PRB pair, an RB pair, or the like.

In addition, the resource block may be constituted by one or more resource elements (Resource Element: RE). For example, 1RE may be a radio resource domain of one subcarrier and one symbol.

The bandwidth part (Bandwidth Part: BWP) (which may be called a partial bandwidth or the like) may represent a sub-set of consecutive common RBs (common resource blocks) for a certain numerology in a certain carrier. Here, the common RB may be specified by an RB index based on a common reference point of the carrier. The PRB may be defined by a BWP and numbered within the BWP.

The BWP may include a BWP for UL (UL BWP) and a BWP for DL (DL BWP). One or more BWPs may be set in one carrier for the UE.

At least one of the set BWPs may be active, and the UE may not assume to transmit or receive any given signal/channel outside the active BWP. Note that "cell", "carrier", and the like in the present disclosure may be replaced with "BWP".

The structures of the radio frame, sub-frame, slot, mini-slot, symbol, and the like described above are merely examples. For example, the number of sub-frames included in the radio frame, the number of slots per sub-frame or radio frame, the number of mini-slots included in the slot, the number of symbols and RBs included in the slot or mini-slot, the number of subcarriers included in the RB, the number of symbols in the TTI, the symbol length, the cyclic prefix (CP) length, and the like can change in various manners.

The terms "connected", "coupled", or any variations thereof, mean any direct or indirect connection or coupling between two or more elements. Also, one or more intermediate elements may be present between two elements that are "connected" or "coupled" to each other. The coupling or connection between the elements may be physical, logical, or a combination thereof. For example, "connection" may be replaced with "access". In the present disclosure, two elements can be "connected" or "coupled" to each other by using one or more wires, cables, printed electrical connections, and as some non-limiting and non-exhaustive examples, by using electromagnetic energy having wavelengths in the radio frequency domain, the microwave region and light (both visible and invisible) regions, and the like.

The reference signal may be abbreviated as Reference Signal (RS) and may be called pilot (Pilot) according to applicable standards.

As used in the present disclosure, the phrase "based on" does not mean "based only on" unless explicitly stated otherwise. In other words, the phrase "based on" means both "based only on" and "based at least on".

The "means" in the configuration of each of the above devices may be replaced with "unit", "circuit", "device", and the like.

Any reference to an element using a designation such as "first", "second", and the like used in the present disclosure generally does not limit the amount or order of those elements. Such designations can be used in the present disclosure as a convenient way to distinguish between two or more elements. Thus, the reference to the first and second elements does not imply that only two elements can be adopted, or that the first element must precede the second element in some or the other manner.

In the present disclosure, the used terms "include", "including", and variants thereof are intended to be inclusive in a manner similar to the term "comprising". Furthermore, the term "or" used in the present disclosure is intended not to be an exclusive disjunction.

Throughout present disclosure, for example, during translation, if articles such as "a", "an", and "the" in English are added, in present disclosure, these articles shall include plurality of nouns following these articles.

The terms "determining" and "determining" as used in the present disclosure may encompass a wide variety of operations. Meaning of "determining" and "determining" may include, for example, considering what has been subjected to judging, calculating, computing, processing, deriving, investigating, looking up, search, or inquiry (for example, searching a table, a database, or another data structure), or ascertaining as having been "determined" or "determined". In addition, "determining" and "determining" may include considering what has been subjected to receiving (for example, receiving information), transmitting (for example, transmitting information), input, output, and accessing (for example, accessing data in a memory) as having been "determined" and "determined". In addition, "determining" and "determining" may include considering what has been subjected to resolving, selecting, choosing, establishing, comparing, and the like as having been "determined" and "determined". That is, the "determining" and "determining"

may include considering some operations as having been "determined" and "determined". Furthermore, "determining (determining)" may be replaced with "assuming", "expecting", "considering", or the like.

In the present disclosure, the term "A and B are different" may mean "A and B are different from each other". Note that the term may mean "A and B are each different from C". Terms such as "leave", "coupled", or the like may also be interpreted in the same manner as "different".

Although the present disclosure has been described in detail above, it will be obvious to those skilled in the art that the present disclosure is not limited to the embodiments described in present disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

REFERENCE SIGNS LIST

10 Radio communication system
20 NG-RAN
100A, 100B gNB
UE 200
210 Radio signal transmitter/receiver
220 Amplifier unit
230 Modulator/demodulator
240 Control signal/reference signal processor
250 Encoder/decoder
260 Data transmitter/receiver
270 Controller
BM Beam
1001 Processor
1002 Memory
1003 Storage
1004 Communication device
1005 Input device
1006 Output device
1007 Bus

The invention claimed is:

1. A terminal, comprising:
a receiver that receives downlink control information from a network; and
a controller that applies a slot format indicated by the downlink control information to a plurality of component carriers,
wherein the controller applies the slot format to all component carriers in a group comprising a subcarrier spacing (SCS) of an active downlink bandwidth part (DL BWP), an SCS of an active uplink bandwidth part (UL BWP), or a combination of the SCS of the active DL BWP and the SCS of the active UL BWP,
wherein at least one of the SCS of the active DL BWP, the SCS of the active UL BWP, or the combination of the SCS of the active DL BWP and the SCS of the active UL BWP, is a same as a reference SCS, and
wherein the reference SCS is set based on at least one of the SCS of the active DL BWP, the SCS of the active UL BWP, or the combination of the SCS of the active DL BWP and the SCS of the active UL BWP, in a designated component carrier (i) with a lowest index or (ii) from which the downlink control information is received.

2. The terminal according to claim 1, wherein the plurality of component carriers is contiguous within an identical frequency band.

3. The terminal according to claim 1, wherein an upper layer setting regarding the slot format is identical among the plurality of component carriers.

4. The terminal according to claim 2, wherein an upper layer setting regarding the slot format is identical among the plurality of component carriers.

* * * * *